United States Patent [19]

Szodfridt et al.

[11] Patent Number: 4,714,147

[45] Date of Patent: Dec. 22, 1987

[54] DOUBLE CLUTCH FOR A MOTOR VEHICLE TRANSMISSION

[75] Inventors: Imre Szodfridt, Stuttgart; Richard Knoblauch, Ditzingen, both of Fed. Rep. of Germany

[73] Assignee: Dr. Ing. h.c.F. Porsche Aktiengesellschaft, Fed. Rep. of Germany

[21] Appl. No.: 889,248

[22] Filed: Jul. 25, 1986

[30] Foreign Application Priority Data

Jul. 25, 1985 [DE] Fed. Rep. of Germany ....... 3526630

[51] Int. Cl.[4] ............................................. F16D 25/10
[52] U.S. Cl. .............................. 192/87.15; 192/87.18; 74/573 R
[58] Field of Search ............... 192/70.28, 70.27, 70.13, 192/70.25, 87.13, 87.18, 101, 109 A, 110 R, 87.15, 87.18; 74/573 R

[56] References Cited

U.S. PATENT DOCUMENTS

| 2,003,212 | 5/1935 | Millican et al. | 192/87.13 X |
| 2,090,264 | 8/1937 | Padgett | 192/70.27 X |
| 2,386,217 | 10/1945 | Kegresse | 192/87.18 X |

FOREIGN PATENT DOCUMENTS 966355  8/1964  United Kingdom ............. 192/87.11

Primary Examiner—George H. Krizmanich

[57] ABSTRACT

The one or the other group of transmission speeds of a motor vehicle transmission is adapted to be alternately connected with a double clutch having a clutch housing driven from the engine crankshaft by way of a central shaft and a hollow shaft concentric thereto. For that purpose, two clutch disks are provided which are hydraulically pressed alternately against a center plate of the clutch housing. Two mutually concentric annular pistons serve for the actuation of the clutch disks which are arranged in a two-partite hydraulic plate threadably fastened at the clutch housing.

17 Claims, 5 Drawing Figures

DOUBLE CLUTCH FOR A MOTOR VEHICLE TRANSMISSION

The present invention relates to a hydraulically actuatable double clutch for a motor vehicle change-speed transmission for alternately coupling a central shaft and a hollow shaft cencentric thereto of a change-speed transmission of a motor vehicle with the housing of the double clutch driven by the engine crankshaft.

A double clutch of this type is described in the German Patent Application P No. 34 46 460.3 which serves the purpose to be able to shift a change-speed transmission of a motor vehicle without tractional force interruption. For that purpose, a central shaft to the transmission is coordinated to one group of transmission speeds, for example, to the first, third and fifth speed and a hollow shaft concentric thereto is coordinated to the second and fourth speed. Both shafts are connected with clutch disks of which one is adapted to be from one side at the axially nondisplaceable center plate of the clutch housing and the other from the other side. The clutch housing is operatively connected with the engine crankshaft and rotates in unison therewith. Two concentric annular pistons serve for the clutch actuation which are arranged in a fixed housing part and act on the clutch disks by way of engaging bearings and cup springs. However, the relatively large assembly space which is required by this double clutch is thereby disadvantageous.

The principal object of the present invention resides in so constructing the double clutch that it requires the least possible amount of space and can be accommodated in the housing of a normal single clutch.

The underlying problems are solved according to the present invention in that the annular pistons are arranged in a hydraulic plate secured at the clutch housing of the double clutch and are provided with several pins symmetrically distributed along the annular end faces which during pressure actuation of the annular pistons act by way of pressure plates on the clutch disks. As the concentric annular pistons are arranged in a hydraulic plate secured at the rotating clutch housing and act on the clutch disks by way of end-face pins, engaging bearings and cup springs can be dispensed with. The double clutch is so small in the axial direction that it can be alternately inserted in lieu of a conventional single clutch into the same housing as a result of which the costs for manufacture and stocking can be reduced.

As the double clutch is subdivided into a dry part consisting of a clutch housing, the clutch disks and the associated pressure plates and into a wet part formed by the hydraulic plate, the clutch disks can be kept completely dry whereby defined friction values are assured. A small leakage at the annular piston is thereby permitted by reason of the subdivision into dry part and wet part.

The hydraulic plate which contains all fluid-conducting channels is assembled of a base plate and of a cover plate. The annular grooves for the annular pistons are machined into the separating plane of the base plate and cover plate which is very advantageous for the manufacture and assembly of the double clutch.

These and other objects, features and advantages of the present invention will become more apparent from the following description when taken in connection with the accompanying drawing which shows, for purposes of illustration only, one embodiment in accordance with the present invention, and wherein.

Figure 1:
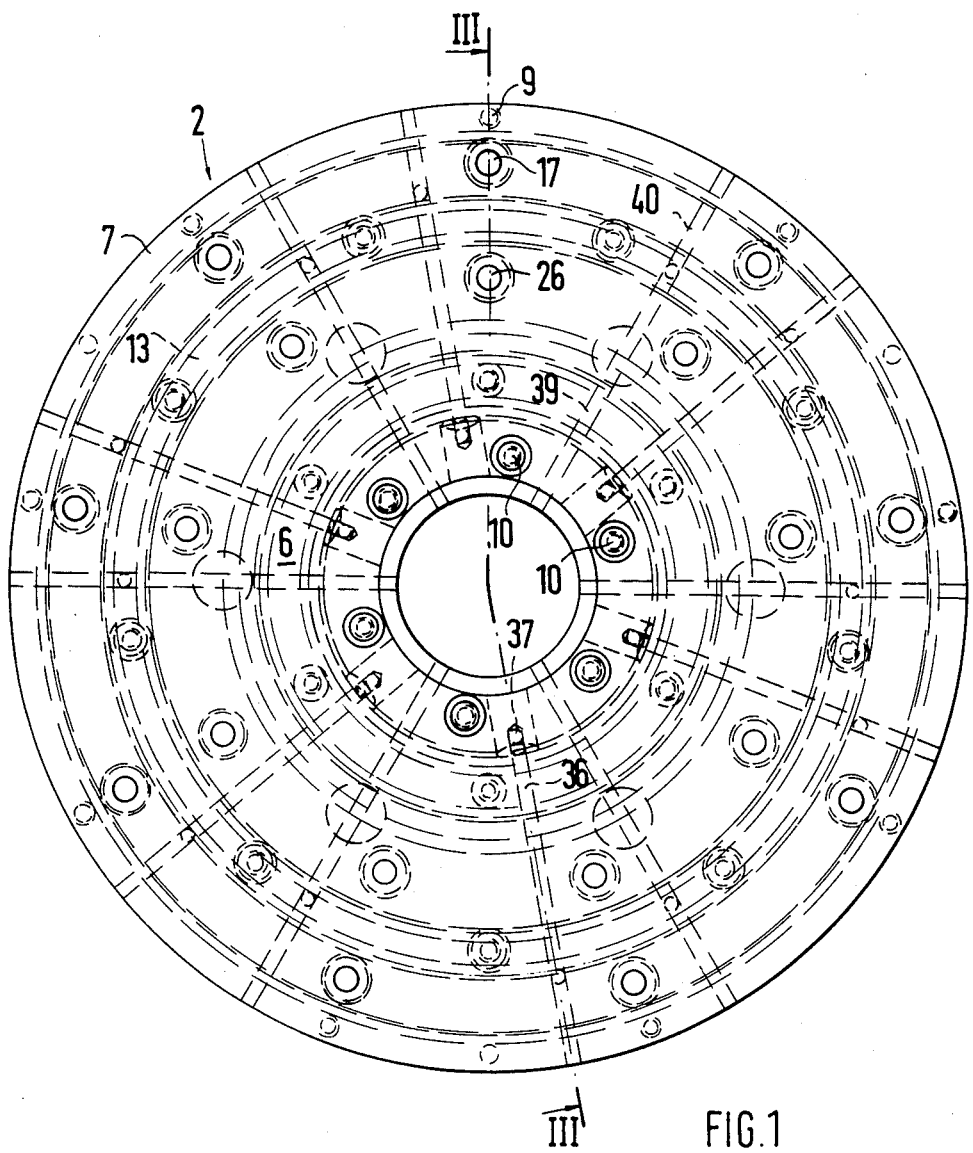
FIG. 1 is an elevational view from the right of a double clutch in accordance with the present invention.
Figure 2:
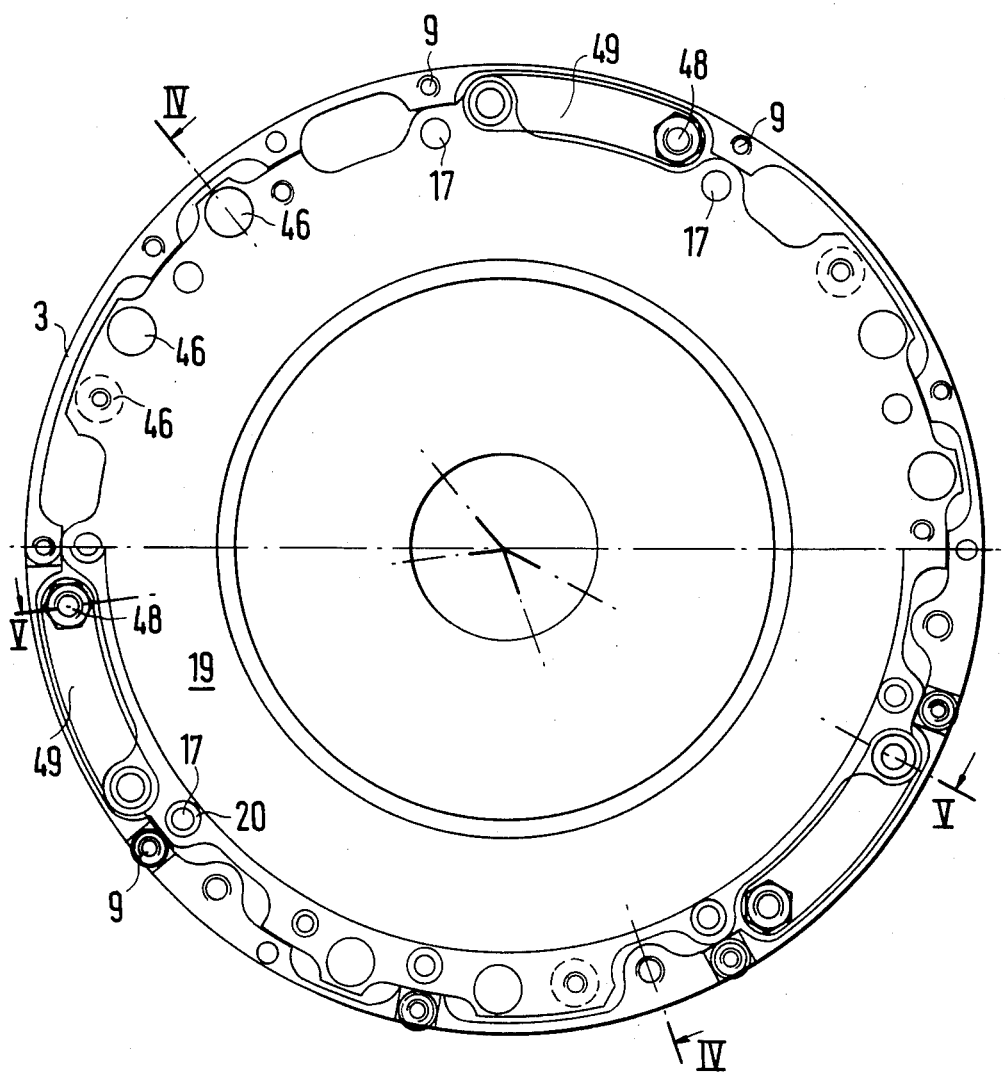
FIG. 2 is an elevational view of the double clutch in accordance with the present invention from the left.
Figure 3:
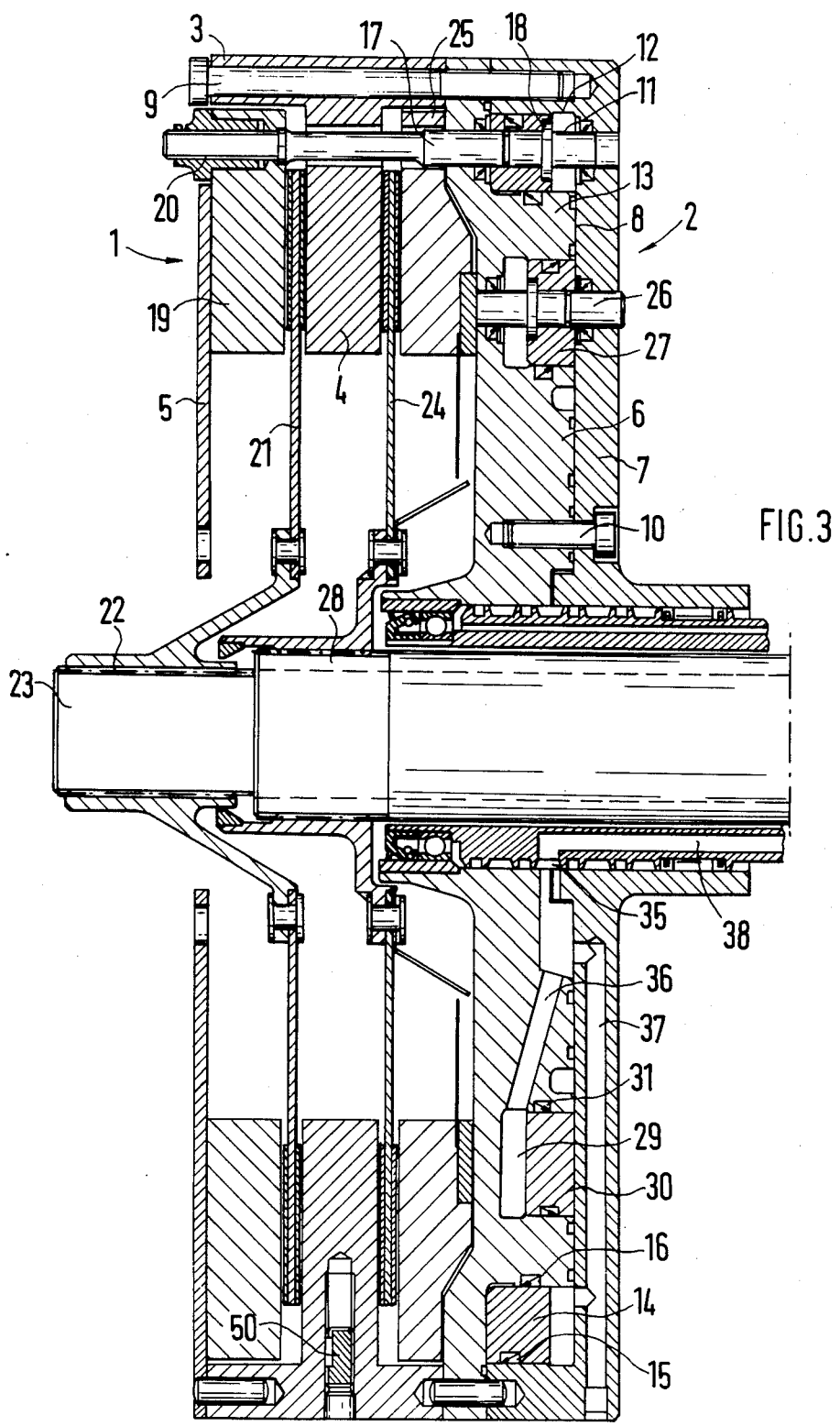
FIG. 3 is a cross-sectional view taken along line III—III of FIG. 1.

Referring now to the drawing wherein like reference numerals are used throughout the various views to designate like parts, a double-clutch in accordance with the present invention is subdivided into a dry area which is enclosed by a clutch housing generally designated by reference numeral 1 and into a wet area which is accommodated in a hydraulic plate generally designated by reference numeral 2 threadably secured to the clutch housing 1 (FIG. 3). The clutch housing 1 consists of an outer cylindrical member 3 which is provided with a center plate 4 and with an entrainment plate 5 threadably secured to the outer member 3; the entrainment plate 5 is thereby adapted to be flangedly connected with an engine crankshaft (not shown). The hydraulic plate 2 is assembled of a base plate 6 and of a cover plate 7 which abut at one another at a separating plane 8. The entrainment plate 5, the outer cylindrical member 3 as well as the base plate 6 and cover plate 7 are threadably connected with one another into a fixed assembly by several bolts 9 symmetrically distributed over the circumference. Additionally, the bolts 10 arranged in proximity of the hub serve for the threaded connection of base plate 6 and cover plate 7.

An outer ring groove 11 is formed in the separating plane 8 by the outer annular surface 12 of a machined recess of the cover plate 7 and by a pin-like extension 13 of the base plate 6 which is smaller in diameter. An outer annular piston 14 is guided in the outer annular groove 11 and is sealed off with respect to the cover plate 7 by means of a sealing ring 15 (FIG. 3) and with respect to the base plate 6 by means of a sealing ring 16. Several pins 17 which are constructed as tie-rods extend through the outer annular piston 14 which sealed-off are guided in the cover plate 7 and in the base plate 6. These pins 17 abut with a collar 18 at that end face of the annular piston 14 which is not acted upon with pressure and project and their other end through a pressure plate 19 abutting at the left side of the clutch, with which they are threadably secured by centering nuts 20 that are fitted into the pressure plate 19. Upon pressure actuation of the outer annular piston 14, the pressure plate 19 is pressed against the left clutch disk 21 by way of the pins 17 and brings the same into frictional engagement with respect to the rotating center plate 4 so that the central shaft 23 form-lockingly connected with the clutch disk 21 by means of a splined-tooth-connection 22 is driven by way of the clutch disk 21. The central shaft 23 is operatively connected with a first group of transmission speeds. A second clutch disk 24 is adapted to be pressed against the center plate 4 from the right side by a pressure plate 25 which is actuated by pins 26 of an inner annular piston 27. A hollow shaft 28 form-lockingly connected with the clutch disk 24 is driven thereby which hollow shaft 28 leads to a second group of transmission speeds. The pins 26 project out of both ends faces of the annular piston in order to create a pressure equalization for the hydraulic pressure conditioned by the rotation. They are guided, on the one hand, in the base plate 6 and, on the other, in the cover plate 7 in a sealed off manner. An annular groove 29 is machined into the base plate 6 at the separating plane 8 for the guidance of the inner annular piston 27 which annular groove 29 has approximately the same width as the outer annular groove 11. An outer sealing ring 30 in the annular piston 27 and an inner sealing ring 31, which is inserted into an annular groove 28 of the base plate 6, serve for sealing purposes.

A sleeve 32 (FIG. 4) is supported centrally in the hydraulic plate 2 which is secured at the transmission housing (not shown). The sleeve contains a pressure connection 33 (FIG. 4) to the inner annular piston 32, a pressure connection 34 to the outer annular piston 14 and a return connection 35 (FIG. 3) loacted therebetween for the hydraulic liquid. Upon actuation of the annular piston 14, respectively, 27, the hydraulic liquid displaced into the return channels 36, respectively, 37 flows together in the return connection 35 and is conducted pressureless to a reservoir by way of the collecting channel 38 extending in the axial direction of the sleeve 32.

Figure 4:
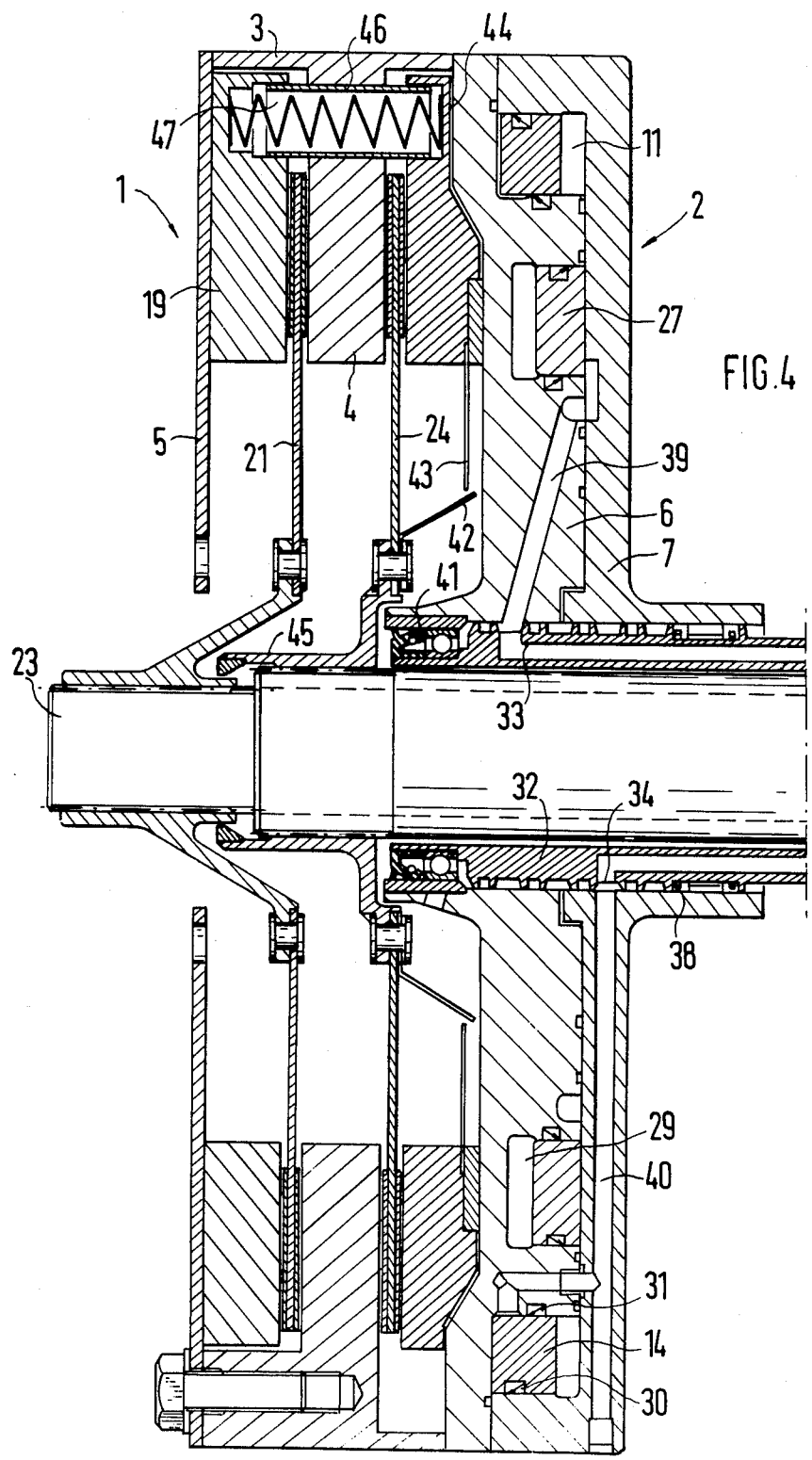
FIG. 4 is a cross-sectional view taken along line IV—IV of FIG. 2.

The pressure channels 39 and 40 to the inner annular piston 27 and the outer annular piston 14 which start from the pressure connections 33 and 34, are illustrated in FIG. 4. The pressure is so regulated that it is zero in one pressure channel when it has reached its maximum value in the other channel. In this manner the clutch disks 21 and 24 are alternately actuated so that always only one of the two groups of transmission speeds is interconnected into the driving connection. The oil discharge at the forward end of the sleeve 32 is prevented by a lip seal 41.

Eventually discharged leakage oil is conducted by the centrifugal force onto a spray hood 42 and from there along a spray baffle plate 43 through a gap 44 radially out of the clutch housing 1 without being able to enter the dry area of the clutch. Small leakage oil quantities which may collect at the clutch hub 45 are also discharged toward the outside along the same path.

Figure 5:
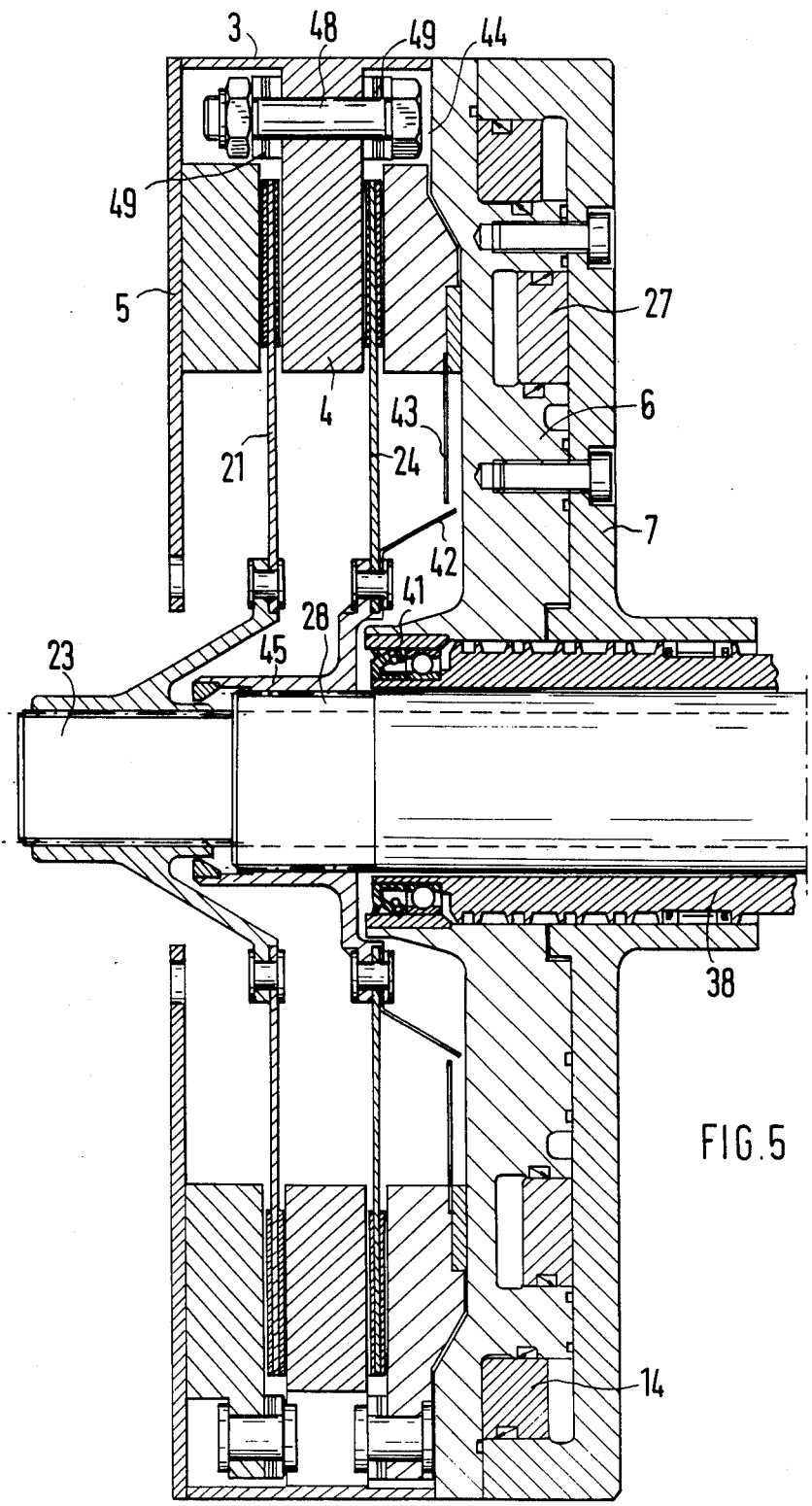
FIG. 5 is a cross-sectional view taken along line V—V of FIG. 2.

Compression springs 47 which are supported at the two pressure plates 19 and 25 and which counteract the pressure actuation thereof are located in the fitting sleeves 46 (FIG. 4). Offset with respect thereto in the circumferential direction fitting or reamed bolts 48 are placed through the two pressure plates 19 and 25 and the center plate 4, by means of which the tangential springs 49 (FIG. 5) disposed between the pressure plates 19 and 25 and the center plate 4 can be stressed which serve for the torque transmission in a conventional, known manner. In order to compensate for any out-of-balance of the clutch, stud bolts 50 (FIG. 3) are screwed radially into the outer member 3 which compensate corresponding imbalance moments by being screwed-in to different depths. After balancing the stud bolts 50 are locked by conventional means.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A double clutch for alternately coupling a central shaft and a hollow shaft concentric thereto of a change-speed transmission of a motor vehicle with a housing means of the double clutch adapted to be operatively connected with an engine crankshaft, comprising first and second clutch disk means, center plate means operatively connected with the clutch housing means to rotate in unison therewith, hydraulic piston means for alternately pressing the first clutch disk means operatively connected with the central shaft from one side against the center plate means and for pressing the second clutch disk means operatively connected with the hollow shaft from the other side against the center plate means, said hydraulic piston means being constructed as a plurality of annular pistons, and hydraulic plate means, the annular pistons being secured in said hydraulic plate means, said hydraulic plate means being operatively connected with the clutch housing means, and several pin means substantially symmetrically extending through said annular pistons which upon pressure actuation of the annular pistons act on the clutch disk means by way of a pressure plate means.

2. A double clutch according to claim 1, wherein said annular pistons are disposed concentrically to one another.

3. A double clutch according to claim 1, wherein the pin means of the outer annular piston are constructed as tie bolts which within one end area of the pin means abut by way of an abutment collar at that end face of the annular piston which is not acted upon by pressure while within the other end area they are threadably connected with the pressure plate means by centering nuts.

4. A double clutch according to claim 1, wherein the pin means project out of both end faces of the annular pistons and are guided in the hydraulic plate means in a sealed off manner.

5. A double clutch according to claim 1, wherein the hydraulic plate means includes a base plate abutting at the clutch housing means and a cover plate, the annular pistons being guided in annular grooves which are formed in a separating plane between the base plate and the cover plate.

6. A double clutch according to claim 5, wherein an outer annular groove is formed by the outer annular surface of the cover plate and a pin-like extension of the base plate smaller in diameter than said outer annular surface an inner annular groove is machined into the base plate with approximately the same depth as the outer annular groove.

7. A double clutch according to claim 1, wherein two pressure plate means are longitudinally displaceable with respect to the clutch housing means by stressing draw spring means inserted between the same.

8. A double clutch according to claim 7, wherein the pressure plate means are torque transmittingly operatively connected with the clutch housing means by way of tangential spring means and are centered at the clutch housing means by fitting bolts.

9. A double clutch according to claim 1, wherein the annular pistons include grooves along their outer surfaces for sealing purposes into which sealing rings are inserted whereas sealing rings serve for the sealing of the inner surfaces of the annular pistons which are inserted into grooves of the base plate.

10. A double clutch according to claim 1, further comprising sleeve means inserted into the hydraulic plate means, the sleeve means having a pressure connection for the outer annular piston, a pressure connection for the inner annular piston as well as a common return connection for the hydraulic liquid disposed between the pressure connections.

11. A double clutch according to claim 1, further comprising stud bolt means for balancing the clutch, said stud bolt means being operable to be screwed radially into the clutch housing means and lockable against rotation.

12. A double clutch according to claim 3, wherein the pin means project out of both end faces of the annular pistons and are guided in the hydraulic plate means in a sealed off manner.

13. A double clutch according to claim 6, wherein the two pressure plate means are longitudinally displaceable with respect to the clutch housing means by stressing draw spring means inserted between the same.

14. A double clutch according to claim 13, wherein the pressure plate means are torque transmittingly operatively connected with the clutch housing means by way of tangential spring means and are centered at the clutch housing means by fitting bolts.

15. A double clutch according to claim 12, wherein the annular pistons include grooves along their outer surfaces for sealing purposes into which sealing rings are inserted whereas sealing rings serve for the sealing of the inner surfaces of the annular pistons which are inserted into grooves of the base plate.

16. A double clutch according to claim 12, further comprising sleeve means inserted into the hydraulic plate means, the sleeve means having a pressure connection for the outer annular piston, a pressure connection for the inner annular piston as well as a common return connection for the hydraulic liquid disposed between the pressure connections.

17. A double clutch according to claim 12, further comprising stud bolt means for balancing the clutch, said stud bolt means being operable to be screwed radially into the clutch housing means and adapted to be locked against rotation.

* * * * *